United States Patent [19]

Siegel

[11] Patent Number: 4,824,088

[45] Date of Patent: Apr. 25, 1989

[54] HOLDER FOR POSITIONING AND HOLDING A PALLET THAT SUPPORTS A WORKPIECE

[76] Inventor: Gunther R. Siegel, Walsh Rd., LaGrangeville, N.Y. 12540

[21] Appl. No.: 152,842

[22] Filed: Feb. 5, 1988

[51] Int. Cl.$^4$ .............................................. B23Q 3/00
[52] U.S. Cl. ................................................... 269/309
[58] Field of Search .................. 269/47, 309, 310, 20, 269/48.1, 52, 296, 217, 227, 229, 232, 235, 24; 198/345

[56] References Cited

U.S. PATENT DOCUMENTS

| | | |
|---|---|---|
| 1,226,763 | 8/1917 | Forney . |
| 1,254,044 | 1/1918 | Johnson . |
| 2,961,900 | 11/1960 | Stanton et al. . |
| 3,362,703 | 1/1968 | Blatt . |
| 3,414,253 | 12/1968 | Mewse ................................. 269/47 |
| 3,565,416 | 2/1971 | Williamson . |
| 3,804,398 | 4/1974 | Bonzi . |
| 3,860,229 | 1/1975 | Anderson . |
| 4,139,188 | 2/1979 | Avedian . |
| 4,196,896 | 4/1980 | Burns ................................... 269/20 |

FOREIGN PATENT DOCUMENTS 1238287 7/1971 United Kingdom .................. 269/47

Primary Examiner—Robert C. Watson
Attorney, Agent, or Firm—Wolmar J. Stoffel

[57] ABSTRACT

The invention is an improved pallet clamp for positioning and holding a pallet supporting a workpiece relative to a machine adapted to operate on the workpiece. The clamp has a base member, a plurality of longitudinally movable registration pins adapted to engage bores on a pallet, a pallet support surface, jaws to engage and clamp the pallet against the support surface, and an actuation means to initially move the registration pins into the bores on the pallet and subsequently move the jaws into clamping engagement.

13 Claims, 3 Drawing Sheets

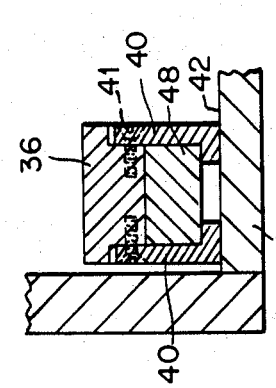
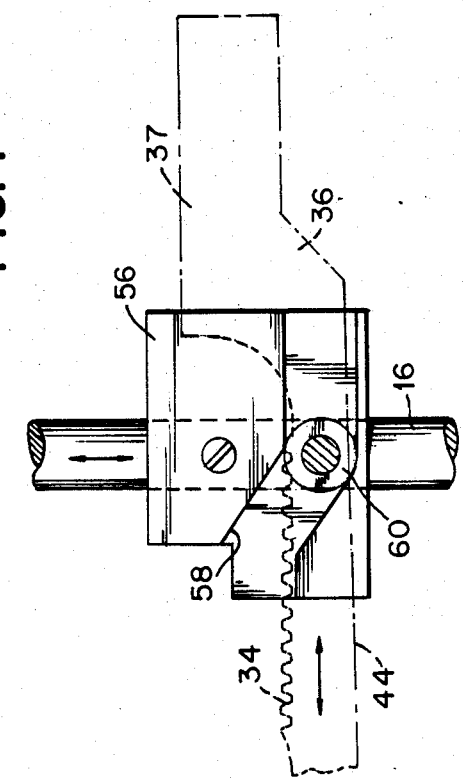
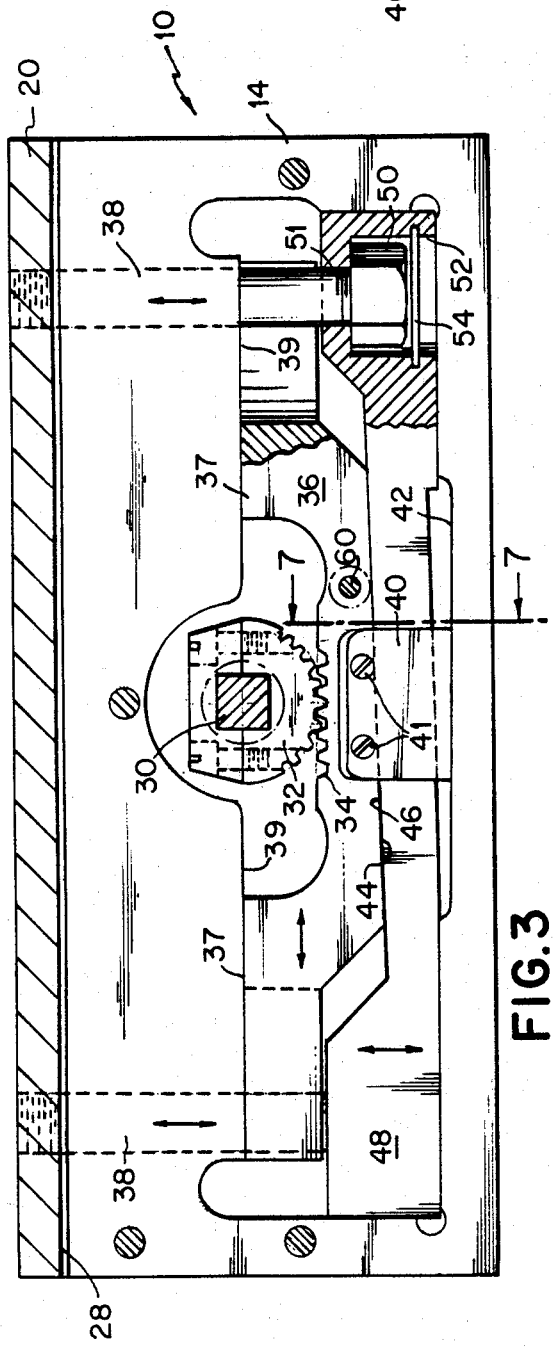
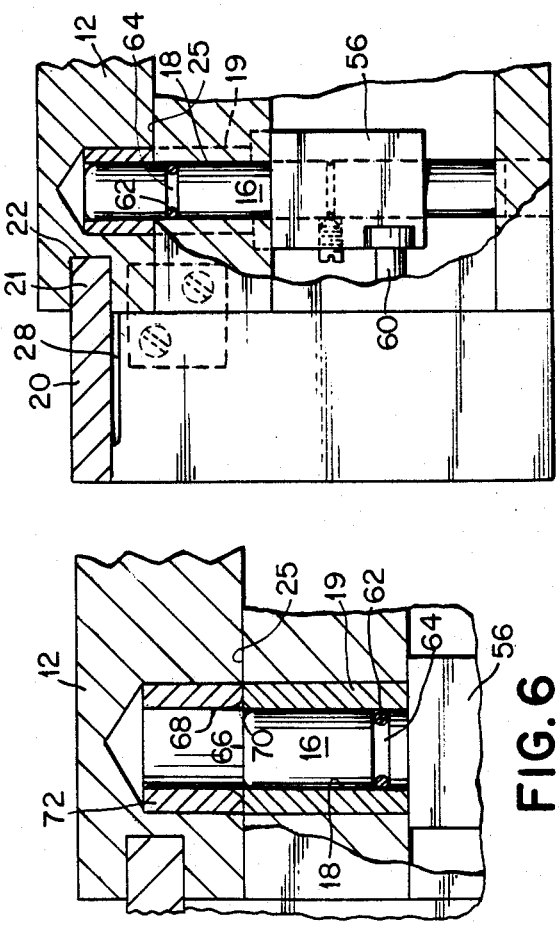

HOLDER FOR POSITIONING AND HOLDING A PALLET THAT SUPPORTS A WORKPIECE

BACKGROUND OF THE INVENTION

This invention relates to apparatus for assembling, shaping, machining, grinding and the like, more particularly to an improved support for positioning and holding a pallet that supports a workpiece to be operated on.

In the prior art, a great many types of clamping devices and support structures are known to hold workpieces during various shaping and machining operations known in the art.

With the advent of automated shaping operations it was inconvenient, and in general inefficient, to clamp a workpiece in a vise or other support which requires an individual accurate repositioning when the workpiece is moved to different machines for subsequent operations. This difficulty was alleviated by mounting the workpiece on a pallet, or providing a base on the workpiece which could be later removed. The pallet therefore provided a standardized reference element that could be repeatedly placed on suitable supports and removed as the situation required. In use the pallet and mounted workpiece can be moved to different standardized supports on different assembly, machining and shaping operations. A set of pallets can be used to hold a number of workpieces during a single or multi-operation on an automated apparatus, the apparatus changed to perform a different operation, and the set of pallets again processed through the subsequent operation.

In order that the pallets be effective, the support for the pallets must be capable of quickly and precisely locating the pallet relative to the machine in the X, Y and Z directions and thereafter firmly hold the pallet in the initial same precise aligned position. The pallet changing operation should be achieved with a very minimum of effort and in a very short time.

Pallet clamps for holding pallets are known. However, the pallet clamps known to the art have various limitations that limit their effectiveness. The known clamps may require a time consuming initial positioning, the pallet may not be sufficiently rigid to prevent movement during the machining operation, or even loosening, or the mechanism is prone to malfunctioning by debris encountered in the various operations.

What is needed in the art is an uncomplicated and reliable clamp that will repeatedly align a workpiece on a pallet to a machine, where the pallet changing operation is quick, simple and positive.

SUMMARY OF THE INVENTION

The object of the invention is to provide an improved clamp mechanism that assures simple, fast and precise positioning and repositioning of a workpiece mounted on a pallet on various machines.

Another object of the invention is to provide a clamp mechanism for a pallet wherein the pallet is given a precise positioning and is subsequently firmly locked in place with a single simple manipulation.

Yet another object to provide a clamp mechanism where the internal moving elements are substantially unaffected by debris, fluids, etc. that are part of the normal machining environment.

In accordance with the aforementioned objectives of the invention, an improved pallet clamp for positioning and holding a pallet supporting a workpiece is provided. The clamp has a base member, a plurality of longitudinally movable registration pins supported on the base adapted to engage corresponding bores on a pallet, and a pallet support surface Jaw means are provided on the base that are adapted to engage and clamp the pallet against the support surface. An actuation means initially moves the registration pins into the bores on the pallet and subsequently moves the jaw means into clamping engagement with the pallet.

BRIEF DESCRIPTION OF THE DRAWINGS

In the accompanying drawings forming a material part of this disclosure:

FIG. 3 is a view taken on line 3—3 of FIG. 2;

FIG. 4 is a detail view of the registration pin elevating mechanism taken on line 4—4 of FIG. 2;

FIG. 5 is a detail view taken on line 5—5 of FIG. 2;

FIG. 6 is a detail view in enlarged scale that illustrates a preferred specific embodiment of the co-actioning structure of the pallet registration bore and the registration pin;

FIG. 7 is a view taken on line 7—7 of FIG. 3.

DESCRIPTION OF THE PREFERRED EMBODIMENT

Figure 1:
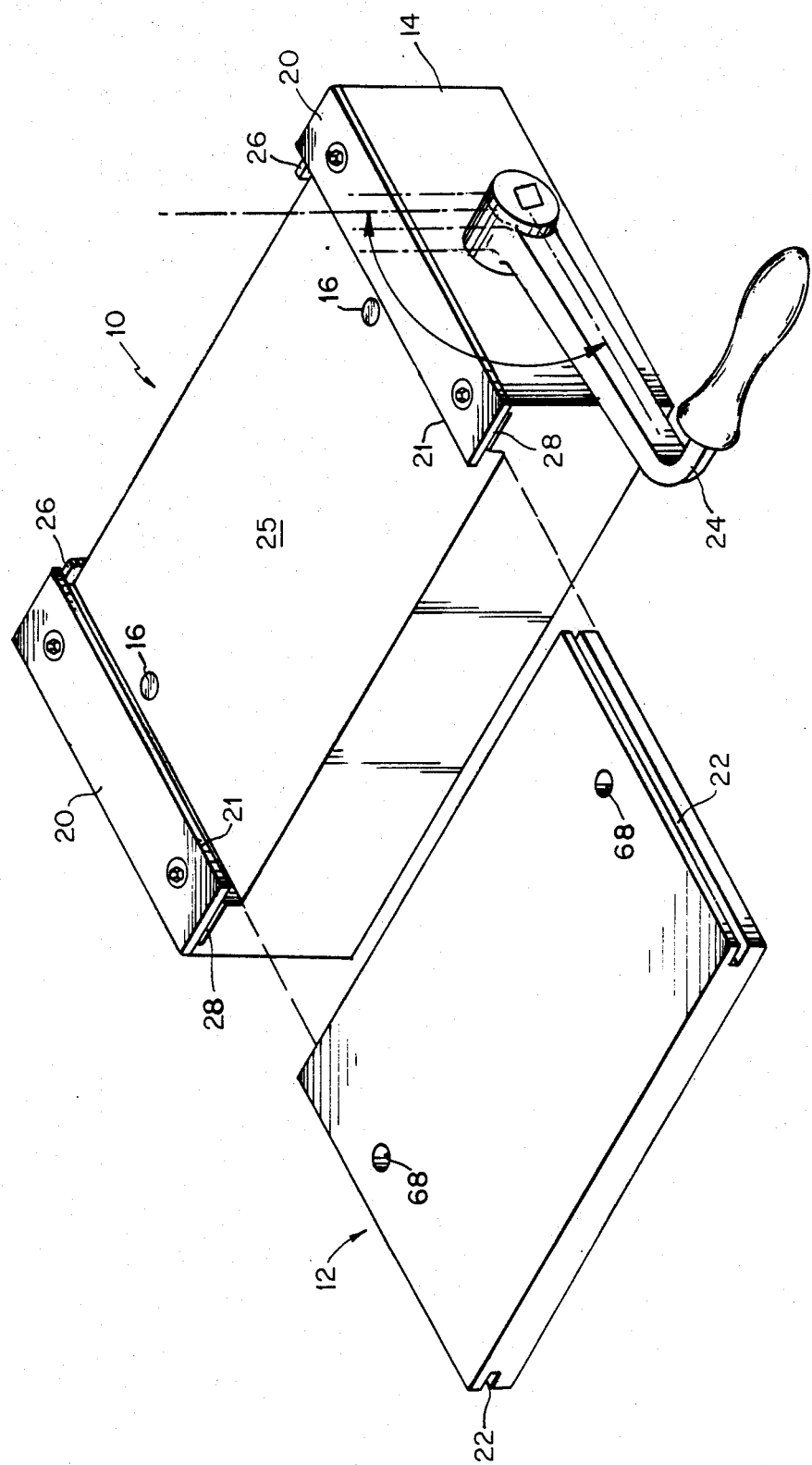
FIG. 1 is a perspective view of a preferred specific embodiment of the pallet clamp of the invention, and a typical pallet for use with the pallet clamp.

Referring now to the Figures in the drawing, in particular FIG. 1, there is illustrated a preferred embodiment of the pallet clamp 10 of my invention, and a typical pallet 12 for use with the pallet clamp 10. The pallet clamp has a base 14, and a pair of spaced, longitudinally movable, registration pins 16. Pallet 12 has a corresponding pair of bores 68 that, in use, receive the ends of the registration pins 16. The base 14 also has a pair of clamping bars 20 that are vertically movable. Preferably the inwardly facing edges 21 of clamping bars 20 are received in grooves 22 of pallet 12. In operation, the pallet 12 is loaded on pallet clamp 10 when handle 24 is in the raised vertical position, which position has the tops of registration pins 16 substantially flush with the surface 25 of the base, and clamping bars 20 located in the upper raised position. Pallet 12 is placed on the base 14 with edges 21 of clamping bars 20 slidably received in grooves 22 of pallet 12. Suitable rails, or a table, not shown, can be provided to facilitate loading the pallet. The pallet is moved until the forward edges abut stops 26. The pallet is thus given a rough, approximate, positioning, relative to the base 14, that is sufficiently accurate to permit entry of the registration pins 16 into bores 68. Handle 24 is then rotated to cause registration pins 16 to enter registration pores 68 which provides a precise locating of the pallet in the X and Y directions. The raising of the pins 16 precedes any clamping action of bars 20. During the initial movement of pins 16, the pallet is free to shift slightly. Thereafter, continued movement of handle 24 causes the clamping bars 20 to descend and bring the bottom surface of the pallet 12 into firm contact with support surface 25. This precisely locates the pallet 12 in the Z direction.

Obviously various changes can be made in the structure within the scope and spirit of the invention. For example, the pallet groove can be eliminated, the support surface 25 modified for partial surface contact with the pallet, the handle 24 can be replaced with a mechanical, electrical or hydraulic actuating means, etc.

Figure 2:
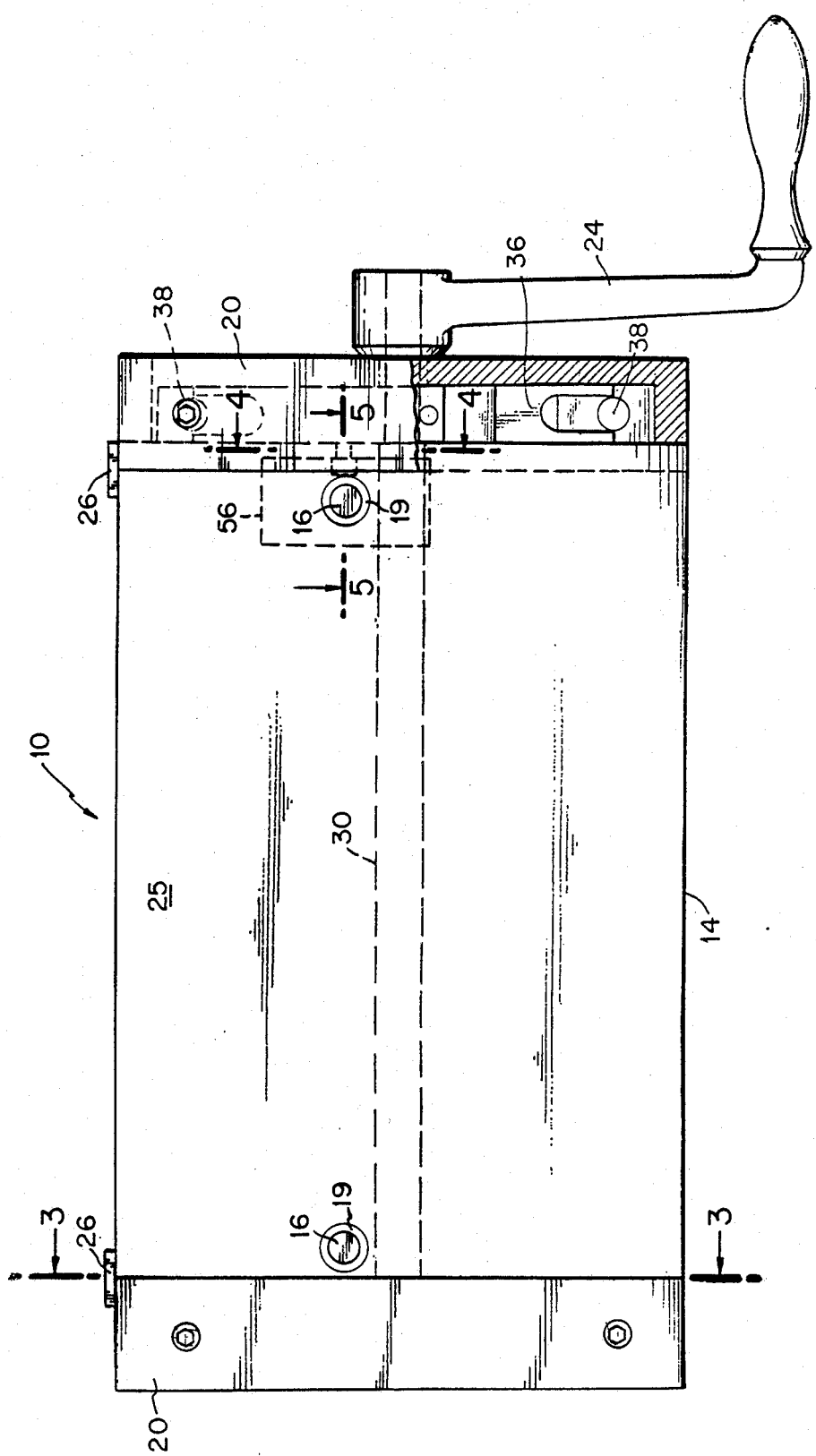
FIG. 2 is a top plan view in partially broken section, of the pallet clamp of the invention.

Referring now to FIGS. 2 through 6, the mechanism that actuates the registration pins 16 and clamping bars 20 in response to movement of handle 24 will be described. As shown in FIG. 2 handle 24 is joined to a rotatable shaft 30 that is supported internally on base 14. On each opposite end of the base 14 there is provided similar mechanisms which will be described. Referring to FIG. 3, pinion gears 32 are mounted on shaft 30 adjacent the opposite sides of base 14. Gear 32 engages a rack 34 on the upwardly facing surface of slide member 36. Slide member 36 is free to slide horizontally within a recess in base 14 in response to rotation of shaft 30. The ends of member 36 are bifurcated, with the ends disposed about guide members 38 which support clamping bars 20. Member 36 has an upwardly facing planar surface 37 that slidably engages downwardly facing surface 39 of base 14. Member 36 is supported by a sliding block 40 joined by bolts 41. The block 40 slidably engages upwardly facing surface 42. The bottom surface 44 of slide member 36 is a camming surface that engages a cam follower surface 46 on linking member 48. Link member 48 is joined to guide members 38, in turn joined to clamping bar 20. The connection between guide member 38 and linking element 48 is a "lost motion" connection. As illustrated in FIG. 3, a circular threaded element 50 is threadably mounted on the lower end 51 of each guide member 38. The threaded element 50 is housed in an enlarged bore 52 in linking element 48. The height of the guide member and clamping bar is adjusted either by (1) rotating threaded element 50 relative to guide member 38 or (2) rotating member 38 or (2) rotating member 38 relative to clamping bar 20. As shown, member 38 is threadably mounted in threaded apertures in member 20. A set screw, accessable through an opening not shown, maintains the setting of member 38 and element 50. After this operation the member 38 can be rotated relative to clamp bar 20 to make the final adjustment. The same set screw prevents rotation of element 50 relative to linking member 48 when it is in the protruding unsecured position. In operation rotation of handle 24 causes rotation of pinion gear 32, which moves slide member 36 in a horizontal direction. The camming surface 44 in contact with cam follower surface 46 forces linking element 48 downwardly, resulting in moving the clamping bar downwardly. The "lost motion" connection between linking element 48 and guide member 38 delays the movement of the clamping bar 20. A locking ring 54 seated in a groove in enlarged bore 52 forces the guide members 38 and attached clamping bar upwardly during the reverse, or unlocking motion of the handle 24.

The registration pins 16 are moved upwardly into aligning operation of pallet 12 and retracted by movement of handle 24. As explained previously, rotation of handle 24 causes horizontal sliding movement of slide members 36. A camming element 56 with a cam surface 58 is mounted on each registration pin 16, as most clearly illustrated in FIG. 4. A cam follower roller 60 contacts cam surface 58. The roller 60 is mounted on slide member 36. Horizontal movement of slide member 36 thus causes registration pin 16 to move upwardly and downwardly. In order to prevent debris and fluids from entering the recess that houses the aforedescribed mechanical elements, a seal 62, preferably an O-ring seal is disposed in a groove 64 on pin 16. As shown in detail in FIG. 6, the top surface 66 of pin 16 is flat and the diameter of the pin is uniform thereby completely filling bore 18. This arrangement reduces the volume of any recess about pin 16 that could in use contain debris, dirt, filings, etc. Preferably the pin 16 is supported in a bushing 19 of hardened steel. The pallet 12 is provided with an aperture 68 with a flared or tapered portion 70 on the lower side that initially receives the pin 16. The flared or tapered portion 70 of the aperture 68 provides a moving action that precisely aligns the pallet to its final position from the initial less precise position when the pallet is placed on the pallet clamp. The apertures 68 are also preferably provided by mounting bushings 72 in an aperture in the pallet clamp.

In operation a pallet is positioned over pallet clamp 10 in its approximate position. Movement of handle 24 causes registration pins 16 to be moved upwardly into engagement with corresponding bores in the pallet. After the pallet has been precisely positioned, the clamping bars 20 force the pallet 12 into engagement with pallet support surface 25. As must clearly be shown in FIG. 5, the edge of clamping bar 20 contacts the outside edge of base 12, due to clearance 28, when the bar is in the clamping position. The guide member 38 is attached near the center of the bar 20. This threaded connection permits a very small pivoting action of the bar edge 21 since the connection has a small amount of looseness. This provides a very firm and positive clamping action that holds the pallet against support surface 25. The pallet can be released by the reverse movement of the handle 24 which releases the clamping bars 20 and retracts the registration pins 16.

It is apparent that changes can be made to the disclosed pallet clamp without departing from the spirit and scope of the invention. For example, the number, location and shape of the registration pins can be changed. Further the shape of the clamping bars and the support surface, as well as the pallet itself, can be altered. Still further, the handle can be substituted with power actuated mechanism, such as a hydraulic, electrical, pneumatic, or other actuator, and modifications to the pin and clamp mechanisms made.

I claim:

1. A pallet clamp for precisely positioning and holding a pallet supporting workpieces comprising,
   a base member;
   a plurality of vertically movable registration pins supported on said base adapted to engage corresponding alignment bores on said pallet;
   at least one upwardly facing pallet support surface on said base member adapted in operation to engage the lower surface of said pallet;
   jaw means movably supported on said base member adapted to engage and clamp said pallet against said support surface; said jaw means comprised of spaced elongated clamping bars located over and in spaced relation to said pallet support surface, and at least two vertically movable guide members supported by said base that are attached to said clamping bars,
   an actuating means for initially moving said registration pins into said corresponding alignment bores, and subsequently moving said jaw means into clamping engagement with said pallet.

2. The pallet clamp of claim 1 wherein at least the upper portions of said registration pins are cylindrical with the top surfaces being flat, said pins located in said base member with said top surfaces being flush with said upper surface when said pins are in the retracted position.

3. The pallet clamp of claim 2 wherein each of said pins is provided with a seal means located below said upper surface of said base member.

4. The pallet clamp of claim 1 wherein said clamping bars have elongated parallel facing edges that are adapted to interact with grooves on the outside edges of a pallet.

5. A pallet clamp for precisely positioning and holing a pallet supporting workpieces comprising:
   a base member;
   a plurality of vertically movable registration pins supported on said base adapted to engage corresponding alignment bores on said pallet;
   at least one upwardly facing pallet support surface on said base member adapted in operation in engage the lower surface of said pallet;
   jaw means movably supported on said base member adapted to engage and clamp said pallet against said support surface, said jaw means including at least two vertically movable guide members supported by said base that are associated with a clamping surface;
   an actuating means for initially moving said registration pins into said corresponding alignment bores, and subsequently moving said jaw means into clamping engagement with said pallet, said actuating means comprised of
   a rotatable shaft within said base member located with its axis transverse to the axes of guide members,
   a pair of horizontally movable slide members within said base member,
   a pair of rack and pinion mechanisms associated with said shaft and said slide members for moving said slide members,
   a linking element connected to each respective pair of guide members, and
   a first camming means associated with each of said slide members and the said associated linking element to move said clamping surface in response to rotation of said shaft.

6. The pallet clamp of claim 5 wherein said actuating means further includes a second camming means associated each of said slide members and the associated registration pin to actuate said pin in response to rotation of said shaft.

7. The pallet clamp of claim 5 wherein said actuating means further includes a lost motion connection between said guide members and said linking elements thereby provide sequential raising of said registration pins and subsequent clamping of said clamping means.

8. The pallet clamp of claim 7 wherein said lost motion connection is comprised of
   (1) an enlarged bore in said linking element,
   (2) a bore in axial alignment with said enlarged bore that receives the lower end of said guide member,
   (3) a ring member disposed on the lower end of said guide member and received in said enlarged bore,
   (4) a groove in the wall of said enlarged bore,
   (5) a snap ring disposed in said groove, said groove located in said bore, a distance from the bottom thereof that is greater than the longitudinal length of said snap ring.

9. The pallet clamp of claim 5 wherein said first camming means is comprised of
   (1) a sloping cam surface on the bottom of said slide member, and
   (2) a cam follower surface on the top of said linking element, in operation horizontal movement of said slide member causes vertical movement of said linking element, which movement is transmitted to said clamping surface.

10. The pallet clamp of claim 6 wherein said second camming means is comprised of
    (1) a cam surface mounted on each of said registration pins,
    (2) a cam follower roller mounted on the side of each of said slide members, in operation horizontal movement of said slide member causes vertical movement of said registration pin.

11. The pallet clamp of claim 5 wherein each of said slide members are provided with bifurated end portions that are disposed about guide members, the depth of said bifurations allowing sliding horizontal movement of said slide member, a recessed gear rack on the upper surface, a sloping cam surface on the lower surface, and a downwardly extending support that slidably engages a horizontal surface in said base member.

12. The pallet clamp of claim 5 wherein a handle is mounted on the end of said shaft for manual actuation of said pallet clamp.

13. The pallet clamp of claim 5 wherein stop means are provided on said base member to provide a rough positioning of a pallet on said pallet clamp.

* * * * *